US011898487B2

(12) United States Patent
Fu et al.

(10) Patent No.: US 11,898,487 B2
(45) Date of Patent: Feb. 13, 2024

(54) ENGINE COOLING SYSTEM AND COOLING METHOD THEREFOR

(71) Applicant: WEICHAI POWER CO., LTD., Shandong (CN)

(72) Inventors: Xiaolei Fu, Shandong (CN); Chao Rong, Shandong (CN); Xia Wang, Shandong (CN); Jianqiang Wei, Shandong (CN)

(73) Assignee: WEICHAI POWER CO., LTD., Shandong (CN)

( * ) Notice: Subject to any disclaimer, the term of this patent is extended or adjusted under 35 U.S.C. 154(b) by 0 days.

(21) Appl. No.: 18/028,377

(22) PCT Filed: Nov. 24, 2020

(86) PCT No.: PCT/CN2020/131225
§ 371 (c)(1),
(2) Date: Mar. 24, 2023

(87) PCT Pub. No.: WO2022/077710
PCT Pub. Date: Apr. 21, 2022

(65) Prior Publication Data

US 2023/0392539 A1 Dec. 7, 2023

(30) Foreign Application Priority Data

Oct. 13, 2020 (CN) ......................... 202011089728.8

(51) Int. Cl.
*F01P 7/16* (2006.01)
*F01P 3/02* (2006.01)
*F02F 1/36* (2006.01)

(52) U.S. Cl.
CPC ................. *F01P 7/165* (2013.01); *F01P 3/02* (2013.01); *F01P 2003/027* (2013.01); *F02F 1/36* (2013.01)

(58) Field of Classification Search
CPC ........ F01P 7/165; F01P 3/02; F01P 2003/027; F01P 7/14; F02F 1/36; F02F 1/10
See application file for complete search history.

(56) References Cited

U.S. PATENT DOCUMENTS

2017/0268405 A1* 9/2017 Yi ........................... F02F 1/004
2021/0239090 A1* 8/2021 Traser ........................ C09J 5/08

FOREIGN PATENT DOCUMENTS

FR 2848248 A1 * 6/2004 ................ F01P 3/02

* cited by examiner

*Primary Examiner* — Syed O Hasan
(74) *Attorney, Agent, or Firm* — Scully, Scott, Murphy & Presser, P.C.

(57) ABSTRACT

The present invention belongs to the technical field of diesel engines, and particularly relates to an engine cooling system and a cooling method therefor. In the engine cooling system of the present invention, when an engine needs to be warmed up, a first valve is opened, a lower engine body water storage chamber is in communication with an upper engine body water storage chamber, and some of the cooling water directly flows into the lower engine body water storage chamber from the upper engine body water storage chamber. The flow of the cooling water entering an engine body is reduced, and under the condition that heat dissipated by the engine is unchanged, the temperature rise of the cooling water flowing through the engine body such as a cylinder sleeve upper cooling water chamber and a cylinder sleeve lower water jacket is faster, such that an engine warming effect is improved.

9 Claims, 3 Drawing Sheets

ENGINE COOLING SYSTEM AND COOLING METHOD THEREFOR

TECHNICAL FIELD

The present disclosure belongs to the technical field of diesel engine, and specifically relates to an engine cooling system and a cooling method therefor.

BACKGROUND

A combustion chamber is a device in which an engine gathers fuel and oxygen to combust therein and generate a large amount of high-temperature gas (heat). It is mainly a space in which a piston is located near a top dead center position, and which is composed of a top surface of the piston, a bottom surface of a cylinder head and relevant parts of a cylinder liner. Therefore, the heat taken away by engine cooling water is mainly obtained from the heat exchange between a bottom plate of the cylinder head, an upper area of the cylinder liner and the high-temperature gas in the combustion chamber. Therefore, the bottom plate of the cylinder head and the upper area of the cylinder liner are key parts for cooling by the cooling water. The heat of the top surface of the piston is mainly cooled by a lubrication system.

With the gradually increasing enhancement level of modern diesel engines, emission requirements are becoming higher and higher; with the gradual application of combustion heat management technology, how to shorten the engine cold state, especially in view of the influence of the cold state of the combustion chamber on combustion and emission, and accurate cooling of the key parts such as the bottom plate of the cylinder head and the upper area of the cylinder liner under high thermal load condition, has become an important issue. In addition, the combustion ambient temperature and emission level at a starting stage of the engine have an increasing influence on the overall emission of the diesel engine. Improving a warming up effect at the starting stage of the diesel engine and reducing the warming up time have become the key issues for improving the combustion and emission performances.

The existing engine cooling systems are not able to synchronously improve the warming up effect and precise cooling effect of the engine.

SUMMARY

An object of the present disclosure is to at least solve the problem that the existing engine cooling systems are not able to synchronously improve the warming up effect and precise cooling effect of the engine. This object is achieved through the following technical solutions.

A first aspect of the present disclosure proposes an engine cooling system, which includes:

a water jacket of an engine body;

the water jacket of the engine body includes: an upper water jacket of the engine body, which is provided with an upper water storage chamber of the engine body, and an upper cooling water chamber of a cylinder liner, which is communicated with the upper water storage chamber of the engine body;

the engine body further includes: a lower water jacket of the engine body, which is provided with a lower water storage chamber of the engine body, and a lower cooling water chamber of the cylinder liner, which is communicated with the lower water storage chamber of the engine body; a first valve is arranged between the lower water storage chamber of the engine body and the upper water storage chamber of the engine body, and the first valve is configured to control the communication or disconnection of the lower water storage chamber of the engine body and the upper water storage chamber of the engine body; and a water jacket of a cylinder head;

the water jacket of the cylinder head includes an upper water jacket of the cylinder head, which is provided with an upper water storage chamber of the cylinder head; the upper water storage chamber of the cylinder head is communicated with the upper cooling water chamber of the cylinder liner; a second valve is arranged between the upper water storage chamber of the cylinder head and the upper water storage chamber of the engine body, and the second valve is configured to control the communication or disconnection of the upper water storage chamber of the cylinder head and the upper water storage chamber of the engine body; and the water jacket of the cylinder head further includes a lower water jacket of the cylinder head, which is communicated with the lower cooling water chamber of the cylinder liner.

In the engine cooling system according to the present disclosure, when the engine needs to be warmed up, the first valve is opened, so that the lower water storage chamber of the engine body is communicated with the upper water storage chamber of the engine body, and part of the cooling water directly flows into the lower water storage chamber of the engine body from the upper water storage chamber of the engine body. A flow rate of the cooling water entering the engine body is reduced. Under the condition that the heat emitted by the engine remains unchanged, the temperature of the cooling water flowing through the engine body parts such as the upper cooling water chamber of the cylinder liner and the lower water jacket of the cylinder liner rises faster, thus improving the warming up effect. When cooling is required, the upper water jacket of the cylinder head is communicated with the upper water storage chamber of the engine body. The cooling water no longer cools the upper part of the cylinder liner and the water storage chamber of the cylinder head, and has a lower temperature, so that the cooling water temperature of the upper water jacket of the cylinder head can be lowered and the cooling effect can be improved.

In addition, the engine cooling system according to the present disclosure can also have the following additional technical features.

In some embodiments of the present disclosure, the engine cooling system further includes:

a first temperature sensor, which is configured to measure the temperature of the lower water jacket of the cylinder head; and a controller; in which the first valve and the second valve are both electronically controlled throttle valves, and the controller controls opening or closing of the first valve according to a signal of the first temperature sensor, or the controller controls opening or closing of the second valve according to the signal of the first temperature sensor.

In some embodiments of the present disclosure, the engine cooling system further includes:

a second temperature sensor, which is configured to measure the temperature of the lower water storage chamber of the engine body; and the controller controls an opening degree of the first valve according to the signal of the first temperature sensor and a signal of the second temperature sensor.

In some embodiments of the present disclosure, after the second valve is opened, the controller controls an opening degree of the second valve according to the signal of the first temperature sensor.

In some embodiments of the present disclosure, a first bypass pipeline is arranged between the lower water storage chamber of the engine body and the upper water storage chamber of the engine body, and the first valve is arranged on the first bypass pipeline; and a second bypass pipeline is arranged between the upper water storage chamber of the cylinder head and the upper water storage chamber of the engine body, and the second valve is arranged on the second bypass pipeline.

In some embodiments of the present disclosure, the engine cooling system further includes:

a thermostat, with which the lower water storage chamber of the engine body is communicated;

a water pump, one end of which is communicated with the upper water storage chamber of the engine body, and the other end of which is communicated with the thermostat; and a heat exchanger, one end of which is communicated with the thermostat, and the other end of which is communicated with the water pump.

The present disclosure also provides an engine cooling method, which is applied to the engine cooling system described above, and which includes the following specific steps:

acquiring a current first temperature value of the lower water jacket of the cylinder head;

if the current first temperature value of the lower water jacket of the cylinder head is smaller than a first set temperature value, then controlling the lower water storage chamber of the engine body to be communicated with the upper water storage chamber of the engine body; and if the current first temperature value of the lower water jacket of the cylinder head is larger than a second set temperature value which is larger than the first set temperature value, then controlling the upper water storage chamber of the cylinder head to be communicated with the upper water storage chamber of the engine body.

In some embodiments of the present disclosure, the controlling the upper water storage chamber of the cylinder head to be communicated with the upper water storage chamber of the engine body includes:

acquiring a current second temperature value of the lower water storage chamber of the engine body;

if the current first temperature value of the lower water jacket of the cylinder head is larger than the first set temperature value, and the current first temperature value of the lower water jacket of the cylinder head is not larger than a third set temperature value which is larger than the first set temperature value and smaller than the second set temperature value, then calculating a first difference between the current second temperature value of the lower water storage chamber of the engine body and the current first temperature value of the lower water jacket of the cylinder head;

if the first difference is not smaller than a set target value, then controlling a flow rate between the lower water storage chamber of the engine body and the upper water storage chamber of the engine body to be reduced, so as to ensure that the current first temperature value of the lower water jacket of the cylinder head is larger than the first set temperature value and not larger than the third set temperature value; and if the first difference is smaller than the set target value, then controlling the lower water storage chamber of the engine body to be disconnected from the upper water storage chamber of the engine body.

In some embodiments of the present disclosure, the controlling the upper water storage chamber of the cylinder head to be communicated with the upper water storage chamber of the engine body includes:

if the current first temperature value of the lower water jacket of the cylinder head is larger than the third set temperature value and not larger than the second set temperature value, then controlling a flow rate between the upper water storage chamber of the cylinder head and the upper water storage chamber of the engine body to be increased, so as to ensure that the current first temperature value of the lower water jacket of the cylinder head is larger than the third set temperature value; and controlling the lower water storage chamber of the engine body to be disconnected from the upper water storage chamber of the engine body.

In some embodiments of the present disclosure, after the controlling the upper water storage chamber of the cylinder head to be communicated with the upper water storage chamber of the engine body, the method further includes:

if the current first temperature value of the lower water jacket of the cylinder head is larger than the second set temperature value , then controlling the upper water storage chamber of the cylinder head to be communicated with the upper water storage chamber of the engine body; and controlling the lower water storage chamber of the engine body to be disconnected from the upper water storage chamber of the engine body.

BRIEF DESCRIPTION OF THE DRAWINGS

Upon reading the detailed description of the preferred embodiments below, various other advantages and benefits will become clear to those skilled in the art. The accompanying drawings are only used for the purpose of illustrating preferred embodiments, and should not be considered as a limitation to the present disclosure. Moreover, throughout the drawings, the same reference signs are used to denote the same components. In the drawings.

Figure 1:
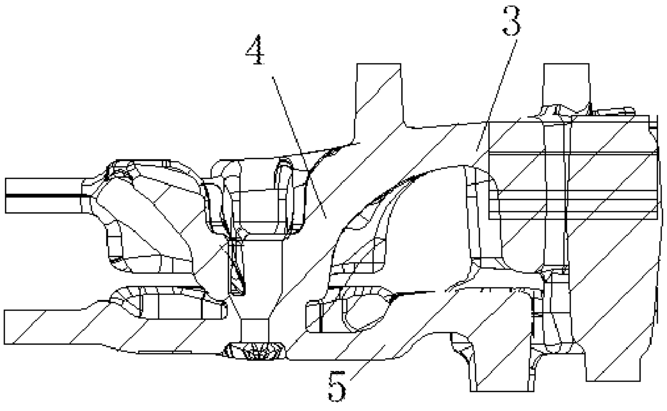
FIG. 1 schematically shows an internal structure of a water jacket of a cylinder head in an engine cooling system according to an embodiment of the present disclosure.

1: upper water storage chamber of engine body; 2: upper cooling water chamber of cylinder liner; 3: water storage chamber of cylinder head; 4: upper water jacket of cylinder head; 5: lower water jacket of cylinder head; 6: lower cooling water chamber of cylinder liner; 7: lower water storage chamber of engine body; 8: ECU controller; 9: first electronically controlled throttle valve; 10: second electronically controlled throttle valve; 11: water pump; 12: heat exchanger; 13: thermostat; 14: first temperature sensor; 15: second temperature sensor.

DETAILED DESCRIPTION

Hereinafter, exemplary embodiments of the present disclosure will be described in greater detail with reference to the accompanying drawings. Although the exemplary embodiments of the present disclosure are shown in the drawings, it should be understood that the present disclosure may be implemented in various forms and should not be limited by the embodiments set forth herein. On the contrary, these embodiments are provided to enable a more thorough understanding of the present disclosure and to fully convey the scope of the present disclosure to those skilled in the art.

It should be understood that the terms used herein are only for the purpose of describing specific exemplary embodiments, and are not intended to be limitative. Unless clearly indicated otherwise in the context, singular forms “a”, “an”, and “said” as used herein may also mean that plural forms are included. Terms “include”, “comprise”, “contain” and “have” are inclusive, and therefore indicate the existence of the stated features, steps, operations, elements and/or components, but do not exclude the existence or addition of one or more other features, steps, operations, elements, components, and/or combinations thereof. The method steps, processes, and operations described herein should not be interpreted as requiring them to be executed in the specific order described or illustrated, unless the order of execution is clearly indicated. It should also be understood that additional or alternative steps may be used.

Although terms “first”, “second”, “third” and the like may be used herein to describe multiple elements, components, regions, layers and/or sections, these elements, components, regions, layers and/or sections should not be limited by these terms. These terms may only be used to distinguish one element, component, region, layer or section from another region, layer or section. Unless clearly indicated in the context, terms such as “first”, “second” and other numerical terms do not imply an order or sequence when they are used herein. Therefore, the first element, component, region, layer or section discussed below may be referred to as a second element, component, region, layer or section without departing from the teachings of the exemplary embodiments.

For ease of description, spatial relative terms may be used herein to describe the relationship of one element or feature relative to another element or feature as shown in the drawings. These relative terms are, for example, “inner”, “outer”, “inside”, “outside”, “below”, “under”, “above”, “over”, etc. These spatial relative terms are intended to include different orientations of the device in use or in operation in addition to the orientation depicted in the drawings. For example, if the device in the figure is turned over, then elements described as “below other elements or features” or “under other elements or features” will be oriented as “above the other elements or features” or “over the other elements or features”. Thus, the exemplary term “below” may include orientations of both above and below. The device can be otherwise oriented (rotated by 90 degrees or in other directions), and the spatial relationship descriptors used herein will be explained accordingly.

Figure 2:
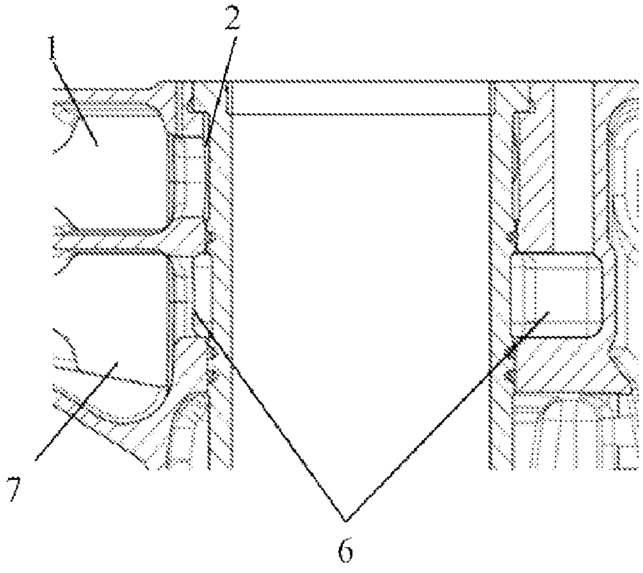
FIG. 2 schematically shows an internal structure of a water jacket of an engine body in the engine cooling system according to the embodiment of the present disclosure.
Figure 3:
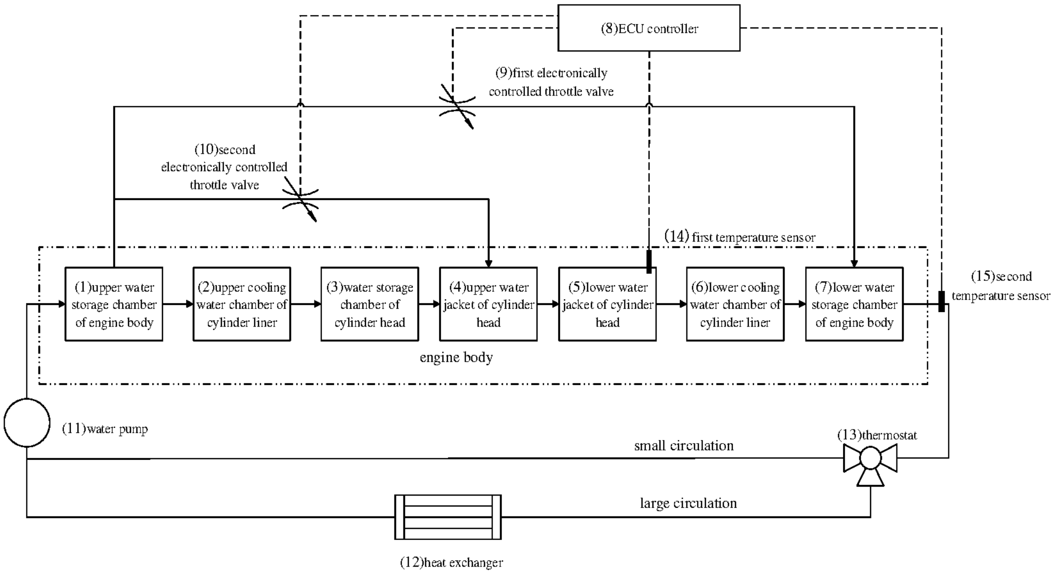
FIG. 3 schematically shows the connection of the engine cooling system according to the embodiment of the present disclosure.

As shown in FIGS. 1 to 3, the engine cooling system in this embodiment includes: a water jacket of an engine body and a water jacket of a cylinder head. The water jacket of the engine body includes: an upper water jacket of the engine body, which is provided with an upper water storage chamber 1 of the engine body, and an upper cooling water chamber 2 of a cylinder liner, which is communicated with the upper water storage chamber 1 of the engine body;

the engine body further includes: a lower water jacket of the engine body, which is provided with a lower water storage chamber 7 of the engine body, and a lower cooling water chamber 6 of the cylinder liner, which is communicated with the lower water storage chamber 7 of the engine body; a first valve is arranged between the lower water storage chamber 7 of the engine body and the upper water storage chamber 1 of the engine body, and the first valve is configured to control the communication or disconnection of the lower water storage chamber 7 of the engine body and the upper water storage chamber 1 of the engine body;

the water jacket of the cylinder head includes an upper water jacket 4 of the cylinder head, which is provided with an upper water storage chamber of the cylinder head; the upper water storage chamber of the cylinder head is communicated with the upper cooling water chamber of the cylinder liner; a second valve is arranged between the upper water storage chamber of the cylinder head and the upper water storage chamber 1 of the engine body, and the second valve is configured to control the communication or disconnection of the upper water storage chamber of the cylinder head and the upper water storage chamber 1 of the engine body; and the water jacket of the cylinder head further includes a lower water jacket 5 of the cylinder head, which is communicated with the lower cooling water chamber 6 of the cylinder liner.

Specifically, a first bypass pipeline is arranged between the lower water storage chamber 7 of the engine body and the upper water storage chamber 1 of the engine body, and the first valve is arranged on the first bypass pipeline. A second bypass pipeline is arranged between the upper water storage chamber of the cylinder head and the upper water storage chamber 1 of the engine body, and the second valve is arranged on the second bypass pipeline.

When the engine needs to be warmed up, the first valve is opened, so that the lower water storage chamber 7 of the engine body is communicated with the upper water storage chamber 1 of the engine body, and part of the cooling water directly flows into the lower water storage chamber 7 of the engine body through the first bypass pipeline from the upper water storage chamber 1 of the engine body. A flow rate of the cooling water entering the engine body is reduced. Under the condition that the heat emitted by the engine remains unchanged, the temperature of the cooling water flowing through the engine body parts such as the upper cooling water chamber 2 of the cylinder liner and the lower water jacket of the cylinder liner rises faster, thus improving the warming up effect. When cooling is required, the upper water jacket 4 of the cylinder head is communicated with the upper water storage chamber 1 of the engine body. The cooling water no longer cools the upper part of the cylinder liner and the water storage chamber 3 of the cylinder head, and has a lower temperature, so that the cooling water temperature of the upper water jacket 4 of the cylinder head can be lowered and the cooling effect can be improved.

In some embodiments of the present disclosure, the engine cooling system further includes:

a first temperature sensor 14, which is configured to measure the temperature of the lower water jacket 5 of the cylinder head; and a controller; in which the first valve and the second valve are both electronically controlled throttle valves, and the controller controls opening or closing of the first valve according to a signal of the first temperature sensor 14, or the controller controls opening or closing of the second valve according to the signal of the first temperature sensor 14.

If a current first temperature value T1 is smaller than a first set temperature value T11, then the lower water storage chamber 7 of the engine body is controlled to be communicated with the upper water storage chamber 1 of the engine body. If the current first temperature value T1 is larger than a second set temperature value T13, then the upper water storage chamber of the cylinder head is controlled to be communicated with the upper water storage chamber 1 of the engine body, in which the second set temperature value T13 is larger than the first set temperature value T11.

In some embodiments of the present disclosure, the engine cooling system further includes:

a second temperature sensor 15, which is configured to measure the temperature of the lower water storage chamber 7 of the engine body; and the controller controls an opening degree of the first valve according to the signal of the first temperature sensor 14 and a signal of the second temperature sensor 15.

In some embodiments of the present disclosure, after the second valve is opened, the controller controls an opening degree of the second valve according to the signal of the first temperature sensor 14.

In some embodiments of the present disclosure, a first bypass pipeline is arranged between the lower water storage chamber 7 of the engine body and the upper water storage chamber 1 of the engine body, and the first valve is arranged on the first bypass pipeline; and a second bypass pipeline is arranged between the upper water storage chamber of the cylinder head and the upper water storage chamber 1 of the engine body, and the second valve is arranged on the second bypass pipeline.

In some embodiments of the present disclosure, the engine cooling system further includes:

a thermostat 13, with which the lower water storage chamber 7 of the engine body is communicated;

a water pump 11, one end of which is communicated with the upper water storage chamber 1 of the engine body, and the other end of which is communicated with the thermostat 13; and a heat exchanger 12, one end of which is communicated with the thermostat 13, and the other end of which is communicated with the water pump 11. The water pump 11, the heat exchanger 12 and the thermostat 13 form the entire cooling system circuit together with the engine. When the temperature is low, a large circulation is closed, and the water only passes through a small circulation, which facilitates temperature rising. When the temperature is high, the water passes through the large circulation and the small circulation is closed, which facilitates heat dissipation.

In the engine cooling system provided by the present disclosure, opening degrees of a first electronically controlled throttle valve 9 and a second electronically controlled throttle valve 10 are controlled by an ECU controller 8. The first temperature sensor 14 is designed to measure the temperature of the lower water jacket 5 of the cylinder head in real time, and the second temperature sensor 15 is designed to measure the temperature of coolant flowing out of the engine in real time. The upper water storage chamber 1 of the engine body and the lower water storage chamber 7 of the engine body are communicated through the first electronically controlled throttle valve 9 and relevant pipelines. The opening degree kl of the first electronically controlled throttle valve 9 is controlled by the ECU controller 8 to adjust the water flow rate of the first bypass pipeline. The upper water storage chamber 1 of the engine body and the upper water jacket 4 of the cylinder head are communicated through the second electronically controlled throttle valve 10 and relevant pipelines. The opening degree k2 of the second electronically controlled throttle valve 10 is controlled by the ECU controller 8 to adjust the water flow rate of this bypass pipeline. The first temperature sensor 14 is installed on the lower water jacket 5 of the cylinder head, and its temperature value T1 is read by the ECU controller 8 in real time; the second temperature sensor 15 is installed at a water outlet of the lower water storage chamber 7 of the engine body, and its temperature value T2 is read by the ECU controller 8 in real time. The engine cooling system provided by the present disclosure combines the double-layer water jacket structure of the engine body with the double-layer water jacket structure of the cylinder head to achieve improved warming up and cooling effects by adjusting the flow rate and flow direction of the water flow.

Figure 4:
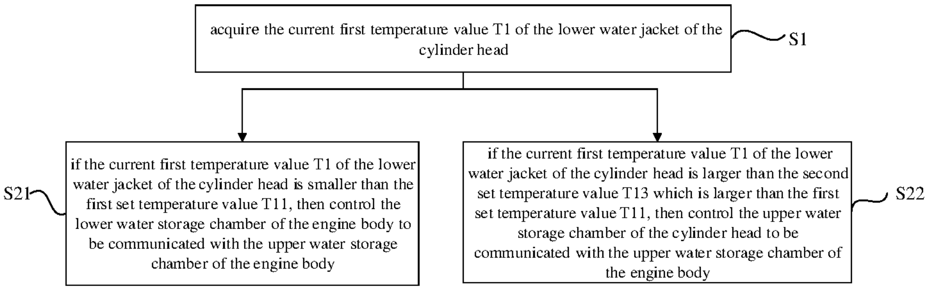
FIG. 4 schematically shows a flow chart of an engine cooling method according to an embodiment of the present disclosure.
Figure 5:
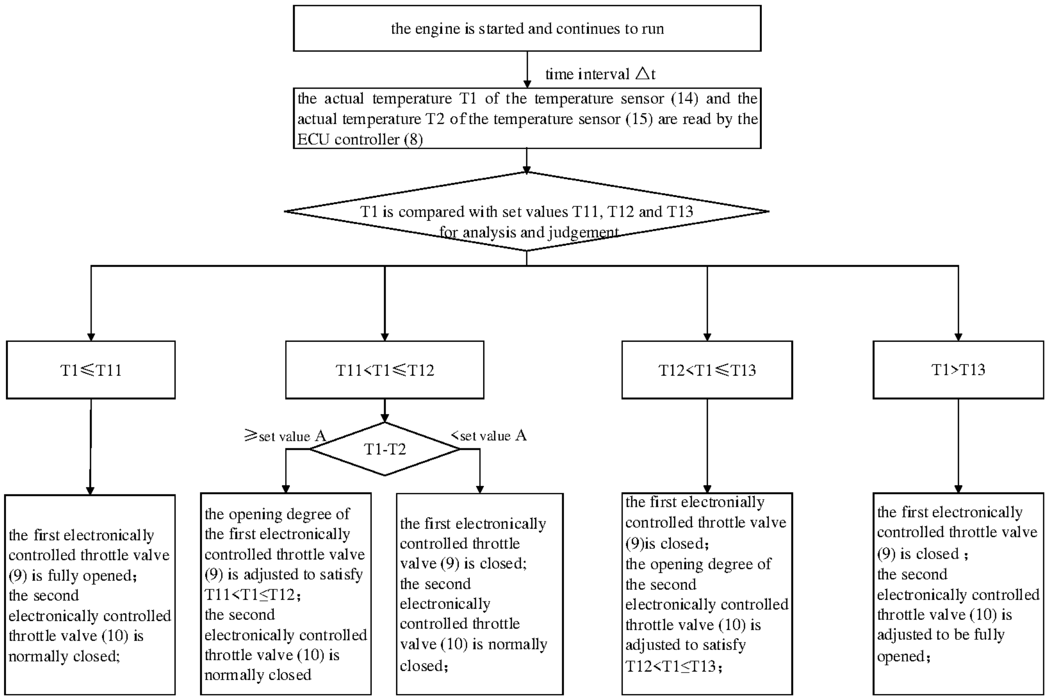
FIG. 5 schematically shows a logic diagram of the engine cooling method according to the embodiment of the present disclosure.

As shown in FIGS. 4 and 5, the present disclosure also provides an engine cooling method, which is applied to the engine cooling system described above, and which includes the following specific steps:

S1: acquiring the current first temperature value T1 of the lower water jacket of the cylinder head;

S21: if the current first temperature value T1 of the lower water jacket of the cylinder head is smaller than the first set temperature value T11, then controlling the lower water storage chamber of the engine body to be communicated with the upper water storage chamber of the engine body; and S22: if the current first temperature value T1 of the lower water jacket of the cylinder head is larger than the second set temperature value T13 which is larger than the first set temperature value T11, then controlling the upper water storage chamber of the cylinder head to be communicated with the upper water storage chamber of the engine body.

In some embodiments of the present disclosure, the controlling the upper water storage chamber of the cylinder head to be communicated with the upper water storage chamber of the engine body includes:

acquiring the current second temperature value T2 of the lower water storage chamber of the engine body;

if the current first temperature value T1 of the lower water jacket of the cylinder head is larger than the first set temperature value T11, and the current first temperature value T1 of the lower water jacket of the cylinder head is not larger than a third set temperature value T12 which is larger than the first set temperature value T11 and smaller than the second set temperature value T13, then calculating a first difference between the current second temperature value T2 of the lower water storage chamber of the engine body and the current first temperature value T1 of the lower water jacket of the cylinder head;

if the first difference is not smaller than a set target value A, then controlling a flow rate between the lower water storage chamber of the engine body and the upper water storage chamber of the engine body to be reduced, so as to ensure that the current first temperature value T1 of the lower water jacket of the cylinder head is larger than the first set temperature value T11 and not larger than the third set temperature value T12; and if the first difference is smaller than the set target value A, then controlling the lower water storage chamber of the engine body to be disconnected from the upper water storage chamber of the engine body.

In some embodiments of the present disclosure, the controlling the upper water storage chamber of the cylinder head to be communicated with the upper water storage chamber of the engine body includes:

if the current first temperature value T1 of the lower water jacket of the cylinder head is larger than the third set temperature value T12 and not larger than the second set temperature value T13, then controlling a flow rate between the upper water storage chamber of the cylinder head and the upper water storage chamber of the engine body to be increased, so as to ensure that the current first temperature value T1 of the lower water jacket of the cylinder head is larger than the third set temperature value T12; and controlling the lower water storage chamber of the engine body to be disconnected from the upper water storage chamber of the engine body.

In some embodiments of the present disclosure, after the controlling the upper water storage chamber of the cylinder head to be communicated with the upper water storage chamber of the engine body, the method further includes:

if the current first temperature value T1 of the lower water jacket of the cylinder head is larger than the second set temperature value T13, then controlling the upper water storage chamber of the cylinder head to be communicated with the upper water storage chamber of the engine body; and controlling the lower water storage chamber of the engine body to be disconnected from the upper water storage chamber of the engine body.

In the engine cooling system of the present disclosure, the main logic is as follows: setting the target temperatures T11, T12 and T13 of the first temperature sensor installed on the lower water jacket of the cylinder head, where $T11<T12<T13$.

After the engine is started, the temperatures of the first temperature sensor and the second temperature sensor are read by the ECU controller in real time. The warming up process is: when the engine is in a cold state, that is, when the temperature T1 of the first temperature sensor is smaller than the set target value T11, the ECU controller makes the second valve (the second electronically controlled throttle valve) in a normally closed state, and makes the first valve (the first electronically controlled throttle valve) in a fully open state. Part of the cooling water directly flows into the lower water storage chamber of the engine body from the upper water storage chamber of the engine body through the bypass pipeline. The flow rate of the cooling water entering the engine body is reduced. Under the condition that the heat emitted by the engine remains unchanged, the temperature of the cooling water flowing through the engine body parts such as the upper cooling water chamber of the cylinder liner and the lower water jacket of the cylinder liner rises faster. Since the combustion chamber is mainly surrounded by the upper cooling water chamber of the cylinder liner and the lower water jacket of the cylinder liner, the warming up effect is improved.

As the temperature of the engine water rises, when the temperature T1 of the first temperature sensor is between T11 and T12, i.e., $T11<T1\leq T12$, it is considered that the engine has preliminarily reached the warming up effect. At this time, the difference between T1 and the temperature T2 of the second temperature sensor is calculated and compared with the set value A. When $T1-T2\geq A$, the opening degree of the first electronically controlled throttle valve is adjusted through the ECU controller (and the second electronically controlled throttle valve is kept normally closed) to reduce the flow passing through the bypass pipeline and increase the flow passing through the engine body, thus ensuring that the temperature T1 of the first temperature sensor is between T11 and T12. When $T1-T2<A$, it is considered that the engine has reached a state in which heat dissipation to the outside is required, and the first electronically controlled throttle valve is closed through the ECU controller. At this time, all the cooling water flows through the engine body.

If the engine load continues to rise, when the temperature T1 of the first temperature sensor rises to be between T12 and T13, i.e., $T12<T1\leq T13$, at this time, the opening degree of the second electronically controlled throttle valve is adjusted by the ECU controller to increase (and the first electronically controlled throttle valve is kept normally closed), so that part of the cooling water directly flows to the upper water jacket of the cylinder head, and the temperature T1 of the first temperature sensor is kept between T12 and T13. This part of cooling water no longer cools the upper cooling water chamber of the cylinder liner and the water storage chamber of the cylinder head which surrounds an exhaust pipeline, and has a lower temperature. Therefore, the cooling water temperature of the upper water jacket of the cylinder head can be lowered, and then a bottom plate top land (I land) at the lower part of the cylinder head can be better cooled through a top-down flushing action, thus achieving a better cooling effect.

When the temperature T1 of the first temperature sensor is larger than T13, the second electronically controlled throttle valve is fully opened through the ECU controller to achieve more accurate cooling of the bottom plate top land at the lower part of the cylinder head.

To sum up, in the engine cooling system according to the present disclosure, when the engine needs to be warmed up, the first valve is opened, so that the lower water storage chamber of the engine body is communicated with the upper water storage chamber of the engine body, and part of the cooling water directly flows into the lower water storage chamber of the engine body from the upper water storage chamber of the engine body. The flow rate of the cooling water entering the engine body is reduced. Under the condition that the heat emitted by the engine remains unchanged, the temperature of the cooling water flowing through the engine body parts such as the upper cooling water chamber of the cylinder liner and the lower water jacket of the cylinder liner rises faster, thus improving the warming up effect. When cooling is required, the upper water jacket of the cylinder head is communicated with the upper water storage chamber of the engine body. The cooling water no longer cools the upper part of the cylinder liner and the water storage chamber of the cylinder head, and has a lower temperature, so that the cooling water temperature of the upper water jacket of the cylinder head can be lowered and the cooling effect can be improved.

Described above are only preferred specific embodiments of the present disclosure, but the scope of protection of the present disclosure is not limited to this. Any change or replacement that can be easily conceived by those skilled in the art within the technical scope disclosed by the present disclosure should be covered within the scope of protection of the present disclosure. Therefore, the scope of protection of the present disclosure shall be accorded with the scope of protection of the claims.

The invention claimed is:

1. An engine cooling system, comprising: a water jacket of an engine body; the water jacket of the engine body comprises: an upper water jacket of the engine body, which is provided with an upper water storage chamber of the engine body, and an upper cooling water chamber of a cylinder liner, which is communicated with the upper water storage chamber of the engine body; the engine body further comprises: a lower water jacket of the engine body, which is provided with a lower water storage chamber of the engine body, and a lower cooling water chamber of the cylinder liner, which is communicated with the lower water storage chamber of the engine body; a first valve is arranged between the lower water storage chamber of the engine body and the upper water storage chamber of the engine body, and the first valve is configured to control the communication or disconnection of the lower water storage chamber of the engine body and the upper water storage chamber of the engine body; and a water jacket of a cylinder head; the water jacket of the cylinder head comprises an upper water jacket of the cylinder head, which is provided with an upper water storage chamber of the cylinder head; the upper water storage chamber of the cylinder head is communicated with the upper cooling water chamber of the cylinder liner; a second valve is arranged between the upper water storage chamber of the cylinder head and the upper water storage chamber of the engine body, and the second valve is configured to control the communication or disconnection of the upper water storage chamber of the cylinder head and the upper water storage chamber of the engine body; the water jacket of the cylinder head further comprises a lower water jacket of the cylinder head, which is communicated with the lower cooling water chamber of the cylinder liner, further comprising: a first temperature sensor, which is configured to measure the temperature of the lower water jacket of the cylinder head; and a controller; wherein the first valve and the second valve are both electronically controlled throttle valves, and the controller controls opening or closing of the first valve according to a signal of the first temperature sensor, or the controller controls opening or closing of the second valve according to the signal of the first temperature sensor.

2. The engine cooling system according to claim 1, further comprising: a second temperature sensor, which is configured to measure the temperature of the lower water storage chamber of the engine body; and the controller controls an opening degree of the first valve according to the signal of the first temperature sensor and a signal of the second temperature sensor.

3. The engine cooling system according to claim 1, wherein after the second valve is opened, the controller controls an opening degree of the second valve according to the signal of the first temperature sensor.

4. The engine cooling system according to claim 1, wherein a first bypass pipeline is arranged between the lower water storage chamber of the engine body and the upper water storage chamber of the engine body, and the first valve is arranged on the first bypass pipeline; and a second bypass pipeline is arranged between the upper water storage chamber of the cylinder head and the upper water storage chamber of the engine body, and the second valve is arranged on the second bypass pipeline.

5. The engine cooling system according to claim 1, further comprising:

a thermostat, with which the lower water storage chamber of the engine body is communicated;

a water pump, one end of which is communicated with the upper water storage chamber of the engine body, and the other end of which is communicated with the thermostat; and a heat exchanger, one end of which is communicated with the thermostat, and the other end of which is communicated with the water pump.

6. An engine cooling method, which is applied to the engine cooling system according to claim 1, and which comprises the following specific steps:

acquiring a current first temperature value of the lower water jacket of the cylinder head;

if the current first temperature value of the lower water jacket of the cylinder head is smaller than a first set temperature value, then controlling the lower water storage chamber of the engine body to be communicated with the upper water storage chamber of the engine body; and if the current first temperature value of the lower water jacket of the cylinder head is larger than a second set temperature value which is larger than the first set temperature value, then controlling the upper water storage chamber of the cylinder head to be communicated with the upper water storage chamber of the engine body.

7. The engine cooling method according to claim 6, wherein the controlling the upper water storage chamber of the cylinder head to be communicated with the upper water storage chamber of the engine body comprises:

acquiring a current second temperature value of the lower water storage chamber of the engine body;

if the current first temperature value of the lower water jacket of the cylinder head is larger than the first set temperature value, and the current first temperature value of the lower water jacket of the cylinder head is not larger than a third set temperature value which is larger than the first set temperature value and smaller than the second set temperature value, then calculating a first difference between the current second temperature value of the lower water storage chamber of the engine body and the current first temperature value of the lower water jacket of the cylinder head;

if the first difference is not smaller than a set target value, then controlling a flow rate between the lower water storage chamber of the engine body and the upper water storage chamber of the engine body to be reduced, so as to ensure that the current first temperature value of the lower water jacket of the cylinder head is larger than the first set temperature value and not larger than the third set temperature value; and if the first difference is smaller than the set target value, then controlling the lower water storage chamber of the engine body to be disconnected from the upper water storage chamber of the engine body.

8. The engine cooling method according to claim 7, wherein the controlling the upper water storage chamber of the cylinder head to be communicated with the upper water storage chamber of the engine body comprises:

if the current first temperature value of the lower water jacket of the cylinder head is larger than the third set temperature value and not larger than the second set temperature value, then controlling a flow rate between the upper water storage chamber of the cylinder head and the upper water storage chamber of the engine body to be increased, so as to ensure that the current first temperature value of the lower water jacket of the cylinder head is larger than the third set temperature value; and controlling the lower water storage chamber of the engine body to be disconnected from the upper water storage chamber of the engine body.

9. The engine cooling method according to claim 8, wherein after the controlling the upper water storage chamber of the cylinder head to be communicated with the upper water storage chamber of the engine body, the method further comprises:

if the current first temperature value of the lower water jacket of the cylinder head is larger than the second set temperature value, then controlling the upper water storage chamber of the cylinder head to be communicated with the upper water storage chamber of the engine body; and controlling the lower water storage chamber of the engine body to be disconnected from the upper water storage chamber of the engine body.

* * * * *